United States Patent
Chen

(10) Patent No.: US 11,122,588 B2
(45) Date of Patent: Sep. 14, 2021

(54) METHOD AND DEVICE FOR ALLOCATING CONTINUOUS SCHEDULING RESOURCE AND TRANSMITTING DATA USING THE CONTINUOUS SCHEDULING RESOURCE

(71) Applicant: China Academy of Telecommunications Technology, Beijing (CN)

(72) Inventor: Li Chen, Beijing (CN)

(73) Assignee: China Academy ot Telecommunications Technology, Beijing (CN)

( * ) Notice: Subject to any disclaimer, the term of this patent is extended or adjusted under 35 U.S.C. 154(b) by 404 days.

(21) Appl. No.: 15/998,968

(22) PCT Filed: Jan. 20, 2017

(86) PCT No.: PCT/CN2017/071943
§ 371 (c)(1),
(2) Date: Aug. 17, 2018

(87) PCT Pub. No.: WO2017/140202
PCT Pub. Date: Aug. 24, 2017

(65) Prior Publication Data
US 2019/0313427 A1     Oct. 10, 2019

(30) Foreign Application Priority Data
Feb. 19, 2016   (CN) .......................... 201610094451.5

(51) Int. Cl.
*H04W 72/08*   (2009.01)
*H04W 72/04*   (2009.01)
(Continued)

(52) U.S. Cl.
CPC ....... *H04W 72/1231* (2013.01); *H04L 1/0003* (2013.01); *H04L 5/0051* (2013.01);
(Continued)

(58) Field of Classification Search
CPC ......... H04W 72/1231; H04W 72/1263; H04W 72/0446; H04W 72/085; H04L 5/0082; H04L 1/0003; H04L 5/0051; H04L 5/005
See application file for complete search history.

(56) References Cited

U.S. PATENT DOCUMENTS 8,699,440 B2   4/2014   Kim et al.
2008/0037505 A1   2/2008   Kim et al.
(Continued)

FOREIGN PATENT DOCUMENTS

CN   10500311 A   8/2009
CN   101500311   *   8/2009
(Continued)

OTHER PUBLICATIONS

3GPP TSG RAN WG1 Meeting #84 "Discussion on specification impact for DL transmissions", Discussion and Decision, Agenda Item 7.3.4.2, Feb. 15-19, 2016, St Julian's, Malta.

*Primary Examiner* — Charles C Jiang
*Assistant Examiner* — Voster Preval
(74) *Attorney, Agent, or Firm* — Foley & Lardner LLP

(57) ABSTRACT

Disclosed in the present invention are a method and a device for allocating a continuous scheduling resource and transmitting data using the continuous scheduling resource, comprising: generating a continuous scheduling resource allocation table for a terminal, wherein the continuous scheduling resource allocation table includes mapping relationships between each continuous scheduling resource and a transmission time interval length and/or a channel condition; sending the continuous scheduling resource allocation table to the terminal. When transmitting data by using continuous scheduling resources, determining the continuous scheduling resource allocation table; after the transmission time interval length and/or channel condition at the time of transmission is determined, determining the continuous (Continued)

```
┌─────────────────────────────────────────────────────┐
│ Determining a list of resource allocation for persistent │
│ scheduling, where the list of resource allocation for    │
│ persistent scheduling includes mapping relationships    │─ 701
│ between persistent scheduling resources and TTI lengths,│
│ and/or, includes mapping relationships between persistent│
│ scheduling resources and channel conditions             │
└─────────────────────────────────────────────────────┘
                          │
                          ▼
┌─────────────────────────────────────────────────────┐
│ Determining each persistent scheduling resource         │
│ according to a mapping relationship in the list of resource │─ 702
│ allocation for persistent scheduling after determining a │
│ TTI length for data transmission, and/or, after determining│
│ a channel condition for data transmission               │
└─────────────────────────────────────────────────────┘
                          │
                          ▼
┌─────────────────────────────────────────────────────┐
│ Transmitting data over the persistent scheduling resources │─ 703
└─────────────────────────────────────────────────────┘
``` scheduling resource according to the mapping relationships in the continuous scheduling resource allocation table; transmitting data using the continuous scheduling resource. Using the present scheme, even if the transmission time interval varies, the continuous scheduling resources can still be used for data transmission.

12 Claims, 6 Drawing Sheets

(51) Int. Cl.
    *H04W 72/12*     (2009.01)
    *H04L 1/00*     (2006.01)
    *H04L 5/00*     (2006.01)

(52) U.S. Cl.
    CPC .......... *H04L 5/0057* (2013.01); *H04L 5/0082* (2013.01); *H04W 72/04* (2013.01); *H04W 72/0446* (2013.01); *H04W 72/085* (2013.01); *H04W 72/12* (2013.01); *H04W 72/1263* (2013.01)

(56) References Cited

U.S. PATENT DOCUMENTS

| | | | | |
|---|---|---|---|---|
| 2008/0080422 | A1* | 4/2008 | Frederiksen | H04L 5/0091 370/329 |
| 2011/0280202 | A1* | 11/2011 | Lee | H04L 5/0044 370/329 |
| 2012/0039288 | A1 | 2/2012 | Kim et al. | |
| 2013/0051266 | A1* | 2/2013 | Kim | H04L 1/1825 370/252 |
| 2014/0247795 | A1* | 9/2014 | Kim | H04W 72/042 370/329 |
| 2014/0301302 | A1* | 10/2014 | Xu | H04L 1/0007 370/329 |
| 2014/0369288 | A1* | 12/2014 | Kim | H04L 1/1896 370/329 |
| 2015/0334685 | A1 | 11/2015 | Ji et al. | |
| 2016/0112992 | A1* | 4/2016 | Bhushan | H04W 72/0493 370/330 |
| 2016/0295584 | A1* | 10/2016 | Chen | H04L 5/0048 |
| 2018/0317249 | A1* | 11/2018 | Caretti | H04W 72/0446 |
| 2019/0028162 | A1* | 1/2019 | Lee | H04B 7/0486 |
| 2020/0266862 | A1* | 8/2020 | Lee | H04B 7/0639 |

FOREIGN PATENT DOCUMENTS

| | | |
|---|---|---|
| CN | 101646243 A | 2/2010 |
| CN | 101730250 A | 6/2010 |
| CN | 102045861 A | 5/2011 |
| CN | 102076104 A | 5/2011 |
| CN | 102316592 A | 1/2012 |
| CN | 104468030 A | 3/2015 |
| EP | 2 262 325 A2 | 12/2010 |
| EP | 2 375 839 A1 | 10/2011 |

\* cited by examiner

METHOD AND DEVICE FOR ALLOCATING CONTINUOUS SCHEDULING RESOURCE AND TRANSMITTING DATA USING THE CONTINUOUS SCHEDULING RESOURCE

CROSS REFERENCE

This application is a US National Stage of International Application No. PCT/CN2017/071943, filed on Jan. 20, 2017, designating the United States and claiming the benefit of Chinese Patent Application No. 201610094451.5, filed with the Chinese Patent Office on Feb. 19, 2016, and entitled "A method and device for allocating persistent scheduling resources, and a method and device for transmitting data over persistent scheduling resources". The entire content of each of the disclosures is incorporated herein by reference in its entirety.

FIELD

The present disclosure relates to the field of wireless communications, and particularly to a method and device for allocating persistent scheduling resources, and a method and device for transmitting data over persistent scheduling resources.

BACKGROUND

During persistent scheduling, a network side device persistently allocates specific resources (e.g., time, frequency, code channel, and etc.) to a terminal, and specifies a specific transmission pattern (e.g., a modulation and coding scheme), and a transmitter transmits data packets in the specified transmission pattern at the specified resource position with the network side device no longer transmitting any scheduling commands. The main purpose of persistent scheduling is to save resources used for scheduling commands of periodically arriving small data packets such as Voice Over IP (VoIP) data packets, thereby improving system capacity and efficiency of resource allocation.

For example, Long Term Evolution (LTE) systems use semi-persistent scheduling, where initial transmission of certain data packets (e.g., voice packets of the VoIP service) are persistently scheduled, whereas retransmission of the data packets, and transmission of other data packets (e.g., Silence Insertion Descriptor (SID) packets of the VoIP service) are dynamically scheduled.

Semi-persistent scheduling is described below taking the VoIP service as an example. FIG. 1 illustrates a VoIP service model. As illustrated in FIG. 1, the VoIP service includes a talk spurt and a silent period. The size of each voice packet is substantially fixed, and a voice packet is generated every 20 ms in the talk spurt; whereas each SID packet has a smaller size than the size of the voice packet, and a SID packet is generated every 160 ms in the silent period.

A base station allocates sufficient fixed resources (e.g., frequency, code channel, and etc.) for a VoIP packet every 20 ms during the talk spurt, i.e., the base station uses persistent scheduling, while retransmission of a voice packet, and initial transmission and retransmission of an SID packet are dynamically scheduled. Semi-persistent scheduling is a tradeoff between resource allocation flexibility and signaling scheduling saving. FIG. 2 illustrates allocation of persistent scheduling resources and transmission over the persistent scheduling resources.

The LTE system uses a fixed frame structure. FIG. 3 illustrates an LTE Time Division Duplex (TDD) frame structure as an example. As illustrated by FIG. 3, each radio frame includes two half-frames, and the length of each half-frame is 5 ms. Each half-frame includes eight slots each having a length of 0.5 ms, and three special slots: a Downlink Pilot Time Slot (DwPTS), a Guard Period (GP), and an Uplink Pilot Time Slot (UpPTS). The lengths of the DwPTS and the UpPTS are configurable, and the total length of the DwPTS, the GP, and the UpPTS should be 1 ms. Sub-frames 1 and 6 each might include a DwPTS, a GP, and an UpPTS, and all the other sub-frames include two adjacent slots, where an i-th sub-frame includes a 2i-th slot and a (2i+1)-th slot. A sub-frame is a Transmission Time Interval (TTI).

The sub-frame 0, the sub-frame 5, and DwPTSes are always reserved for downlink transmission.

Switch-point periodicities of 5 ms and 10 ms are supported.

For the 5 ms periodicity, UpPTSes, the sub-frame 2, and the sub-frame 7 are reserved for downlink transmission.

For the 10 ms periodicity, DwPTSes exists in both of the two half-frames, but the GP and the UpPTS only exist in the first half-frame, where the length of the DwPTS in the second half-frame is 1 ms. The UpPTS and the sub-frame 2 are reserved for uplink transmission.

Different uplink-downlink sub-frame configurations can be used according to the different switch-point periodicities of uplink and downlink sub-frames. Uplink-downlink sub-frame configurations supported in existing specifications are as depicted in Table 1, where the configurations 0 to 2 are for the uplink and downlink sub-frames switch-point periodicity of 5 ms, and the configurations 3 to 6 are for the uplink and downlink sub-frames switch-point periodicity of 10 ms.

TABLE 1

| Uplink-downlink sub-frame configurations | | | | | | | | | | |
|---|---|---|---|---|---|---|---|---|---|---|
| | Sub-frame Number | | | | | | | | | |
| Configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Transmission Time Interval (TTI) is a smallest unit of time for scheduling and transmission, and the TTI has a fixed length of 1 ms in the LTE system. Therefore, data packet transmission is persistently scheduled by allocating Physical Resource Blocks (PRBs) at specified positions in a sub-frame of 1 ms.

However, a drawback of the existing technology is that: when the TTI length is variable, available resources for each TTI might be different, and sizes of radio units (RUs) for resource allocation might be different, so the persistent scheduling scheme of the LTE system is no longer applicable due to the fixed periodicity, the fixed amount of resource, and the fixed transmission pattern. Moreover, the existing technology provides no solution to persistent scheduling in a frame structure having a variable TTI length.

SUMMARY

Embodiments of the disclosure provide a method and device for allocating persistent scheduling resources, and a method and device for transmitting data over persistent scheduling resources.

An embodiment of the disclosure provides a method for allocating persistent scheduling resources. The method includes: generating a list of resource allocation for persistent scheduling, where the list of resource allocation for persistent scheduling includes mapping relationships between persistent scheduling resources and TTI lengths, and/or, includes mapping relationships between persistent scheduling resources and channel conditions; and transmitting the list of resource allocation for persistent scheduling to a terminal.

In an embodiment, the terminal is a terminal which needs to transmit service data over persistent scheduling resources.

In an embodiment, the mapping relationships are determined according to one or a combination of following factors: a requirement for different TTI lengths, optional TTI lengths, and air-interface resources allocated for persistent scheduling.

In an embodiment, the list of resource allocation for persistent scheduling is transmitted to the terminal in a unicast mode. Or, the list of resource allocation for persistent scheduling is transmitted to a group of terminals including the above-mentioned terminal in one or more control commands.

In an embodiment, each of the persistent scheduling resources includes one or a combination of: a transmission direction, a periodicity, a resource position, a Modulation and Coding Scheme (MCS), and an activation state.

An embodiment of the disclosure provides a method for transmitting data over persistent scheduling resources. The method includes: determining a list of resource allocation for persistent scheduling, where the list of resource allocation for persistent scheduling includes mapping relationships between persistent scheduling resources and TTI lengths, and/or, includes mapping relationships between persistent scheduling resources and channel conditions; determining each persistent scheduling resource according to a mapping relationship in the list of resource allocation for persistent scheduling after determining a TTI length for data transmission, and/or, after determining a channel condition for data transmission; and transmitting data over the persistent scheduling resources.

In an embodiment, each TTI length is configured semi-statically or dynamically by a network side device, when each persistent scheduling resource is determined according to the mapping relationship in the list of resource allocation for persistent scheduling at a time occasion corresponding to cacti periodicity of persistent scheduling.

In an embodiment, the channel condition is determined by a terminal according to a downlink Channel Quality Indicator (CQI) and is determined by a network side device according to the CQI fed back by the terminal, to determine a persistent scheduling resource for downlink transmission from the network side device to the terminal; or, the channel condition is determined by the network side device according to downlink channel quality derived from channel quality measurement performed by the network side device based on an uplink pilot signal or uplink data transmitted by the terminal, and is determined by the terminal according to a measurement of downlink channel quality by the terminal, to determine the persistent scheduling resource for downlink transmission from the network side device to the terminal; or, the channel condition is determined by the terminal according to uplink channel quality derived from measurement of the downlink channel quality by the terminal, and is determined by the network side device according to the CQI fed back by the terminal, to determine a persistent scheduling resource for uplink transmission from the terminal to the network device; or, the channel condition is determined by the terminal according to the uplink channel quality derived from measurement of the downlink channel quality by the terminal, and is determined by the network side device according to the channel quality measurement performed by the network side device based on the uplink pilot signal or the uplink data transmitted by the terminal, to determine the persistent scheduling resource for uplink transmission from the terminal to the network device; or, the channel condition is determined by the terminal according to feedback of the network side device on the uplink channel quality measurement performed by the network side device based on the uplink pilot signal or the uplink data transmitted by the terminal, and is determined by the network side device according to the channel quality measurement performed by the network side device based on the uplink pilot signal or the uplink data transmitted by the terminal, to determine the persistent scheduling resource for uplink transmission from the terminal to the network device.

In an embodiment, the channel condition is determined by a receiver according to measurement of quality of a channel from a transmitter to the receiver performed by the receiver, and is determined by the transmitter according to feedback of the receiver on the measurement of the quality of the channel from the transmitter to the receiver. Or, the channel condition is determined by the receiver according to the measurement of the quality of the channel from the transmitter to the receiver performed by the receiver, and is determined by the transmitter through channel reciprocity according to measurement of quality of a channel from the receiver to the transmitter performed by the transmitter.

In an embodiment, each persistent scheduling resource includes one or a combination of: a transmission direction, a periodicity, a resource position, an MCS, and an activation state.

An embodiment of the disclosure provides a device for allocating persistent scheduling resources. The device includes: a generating module configured to generate a list of resource allocation for persistent scheduling, where the list of resource allocation for persistent scheduling includes mapping relationships between persistent scheduling resources and TTI lengths, and/or, includes mapping relationships between persistent scheduling resources and channel conditions; and a transmitting module configured to transmit the list of resource allocation for persistent scheduling to a terminal.

In an embodiment, the generating module is further configured to generate the list of resource allocation for persistent scheduling for the terminal, which needs to transmit service data over persistent scheduling resources.

In an embodiment, the generating module is further configured to determine the mapping relationships according to one or a combination of following factors: a requirement for different TTI lengths, optional TTI lengths, and air-interface resources allocated for persistent scheduling.

In an embodiment, the transmitting module is further configured to: transmit the list of resource allocation for persistent scheduling to the terminals in a unicast mode; or, transmit the list of resource allocation for persistent scheduling to a group of terminals in one or more control commands.

In an embodiment, each of the persistent scheduling resources includes one or a combination of: a transmission direction, a periodicity, a resource position, an MCS, and an activation state.

An embodiment of the disclosure provides a device for transmitting data over persistent scheduling resources. The device includes: an allocation list determining module configured to determine a list of resource allocation for persistent scheduling, where the list of resource allocation for persistent scheduling includes mapping relationships between persistent scheduling resources and TTI lengths, and/or, includes mapping relationships between persistent scheduling resources and channel conditions; a resource determining module configured to determine each persistent scheduling resource according to a mapping relationship in the list of resource allocation for persistent scheduling after determining a TTI length for data transmission, and/or, after determining a channel condition for data transmission; and a transmitting module configured to transmit data over the persistent scheduling resources.

In an embodiment, the resource determining module is further configured to use each TTI length configured semi-statically or dynamically by a network side device, when determining each persistent scheduling resource according to the mapping relationship in the list of resource allocation for persistent scheduling at a time occasion corresponding to each periodicity of persistent scheduling.

In an embodiment, the resource determining module is further configured to determine the channel condition as follows: the channel condition is determined by a terminal according to a downlink CQI and is determined by a network side device according to the CQI fed back by the terminal, to determine a persistent scheduling resource for downlink transmission from the network side device to the terminal; or, the channel condition is determined by the network side device according to downlink channel quality derived from channel quality measurement performed by the network side device based on an uplink pilot signal or uplink data transmitted by the terminal, and is determined by the terminal according to a measurement of downlink channel quality by the terminal, to determine the persistent scheduling resource for downlink transmission from the network side device to the terminal; or, the channel condition is determined by the terminal according to uplink channel quality derived from measurement of the downlink channel quality by the terminal, and is determined by the network side device according to the CQI fed back by the terminal, to determine a persistent scheduling resource for uplink transmission from the terminal to the network device; or, the channel condition is determined by the terminal according to the uplink channel quality derived from measurement of the downlink channel quality by the terminal, and is determined by the network side device according to the channel quality measurement performed by the network side device based on the uplink pilot signal or the uplink data transmitted by the terminal, to determine the persistent scheduling resource for uplink transmission from the terminal to the network device; or, the channel condition is determined by the terminal according to feedback of the network side device on the uplink channel quality measurement performed by the network side device based on the uplink pilot signal or the uplink data transmitted by the terminal, and is determined by the network side device according to the channel quality measurement performed by the network side device based on the uplink pilot signal or the uplink data transmitted by the terminal, to determine the persistent scheduling resource for uplink transmission from the terminal to the network device.

In an embodiment, the resource determining module is further configured to determine the channel condition as follows: the channel condition is determined by a receiver according to measurement of quality of a channel from a transmitter to the receiver performed by the receiver, and is determined by the transmitter according to feedback of the receiver on the measurement of the quality of the channel from the transmitter to the receiver; or, the channel condition is determined by the receiver according to the measurement of the quality of the channel from the transmitter to the receiver performed by the receiver, and is determined by the transmitter through channel reciprocity according to measurement of quality of a channel from the receiver to the transmitter performed by the transmitter.

In an embodiment, each persistent scheduling resource includes one or a combination of: a transmission direction, a periodicity, a resource position, an MCS, and an activation state.

An embodiment of the disclosure provides another device for allocating persistent scheduling resources. The device includes a processor and a transceiver. The processor is configured to read a program in a memory to: generate a list of resource allocation for persistent scheduling, where the list of resource allocation for persistent scheduling includes mapping relationships between persistent scheduling resources and TTI lengths, and/or, includes mapping relationships between persistent scheduling resources and channel conditions. The transceiver is configured to transmit and receive data under control of the processor to: transmit the list of resource allocation for persistent scheduling to a terminal.

In an embodiment, the processor is further configured to determine the mapping relationships according to one or a combination of following factors: a requirement for different TTI lengths, optional TTI lengths, and air-interface resources allocated for persistent scheduling.

In an embodiment, the transceiver is configured to be controlled by the processor to: transmit the list of resource allocation for persistent scheduling to the terminal in a unicast mode; or, transmit the list of resource allocation for persistent scheduling to a group of terminals in one or more control commands.

In an embodiment, each of the persistent scheduling resources includes one or a combination of: a transmission direction, a periodicity, a resource position, an MCS, and an activation state.

An embodiment of the disclosure provides another device for transmitting data over persistent scheduling resources. The device includes a processor and a transceiver. The processor is configured to read a program in a memory to: determine a list of resource allocation for persistent scheduling, where the list of resource allocation for persistent scheduling includes mapping relationships between persistent scheduling resources and TTI lengths, and/or, includes mapping relationships between persistent scheduling resources and channel conditions; and, determine each persistent scheduling resource according to a mapping relationship in the list of resource allocation for persistent scheduling after determining a TTI length for data transmission, and/or, after determining a channel condition for data transmission. The transceiver is configured to transmit and receive data under control of the processor to: transmit data over the persistent scheduling resources.

In an embodiment, the processor is further configured to use each TTI length configured semi-statically or dynamically by a network side device, when determining each persistent scheduling resource according to the mapping relationship in the list of resource allocation for persistent scheduling at a time occasion corresponding to each periodicity of persistent scheduling.

In an embodiment, the processor is further configured to determine the channel condition as follows: the channel condition is determined by a terminal according to a downlink CQI and is determined by a network side device according to the CQI fed back by the terminal, to determine a persistent scheduling resource for downlink transmission from the network side device to the terminal; or, the channel condition is determined by the network side device according to downlink channel quality derived from channel quality measurement performed by the network side device based on an uplink pilot signal or uplink data transmitted by the terminal, and is determined by the terminal according to a measurement of downlink channel quality by the terminal, to determine the persistent scheduling resource for downlink transmission from the network side device to the terminal; or, the channel condition is determined by the terminal according to uplink channel quality derived from measurement of the downlink channel quality by the terminal, and is determined by the network side device according to the CQI fed back by the terminal, to determine a persistent scheduling resource for uplink transmission from the terminal to the network device; or, the channel condition is determined by the terminal according to the uplink channel quality derived from measurement of the downlink channel quality by the terminal, and is determined by the network side device according to the channel quality measurement performed by the network side device based on the uplink pilot signal or the uplink data transmitted by the terminal, to determine the persistent scheduling resource for uplink transmission from the terminal to the network device; or, the channel condition is determined by the terminal according to feedback of the network side device on the uplink channel quality measurement performed by the network side device based on the uplink pilot signal or the uplink data transmitted by the terminal, and is determined by the network side device according to the channel quality measurement performed by the network side device based on the uplink pilot signal or the uplink data transmitted by the terminal, to determine the persistent scheduling resource for uplink transmission from the terminal to the network device.

In an embodiment, the processor is further configured to determine the channel condition as follows: the channel condition is determined by a receiver according to measurement of quality of a channel from a transmitter to the receiver performed by the receiver, and is determined by the transmitter according to feedback of the receiver on the measurement of the quality of the channel from the transmitter to the receiver; or, the channel condition is determined by the receiver according to the measurement of the quality of the channel from the transmitter to the receiver performed by the receiver, and is determined by the transmitter through channel reciprocity according to measurement of quality of a channel from the receiver to the transmitter performed by the transmitter.

In an embodiment, each persistent scheduling resource includes one or a combination of: a transmission direction, a periodicity, a resource position, an MCS, and an activation state.

BRIEF DESCRIPTION OF THE DRAWINGS

The drawings described herein are intended to facilitate further understanding of the disclosure, and constitute a part of the disclosure. The embodiments of the disclosure and a description thereof are intended to explain the disclosure instead of limiting the disclosure.

DETAILED DESCRIPTION OF THE EMBODIMENTS

Figure 1:
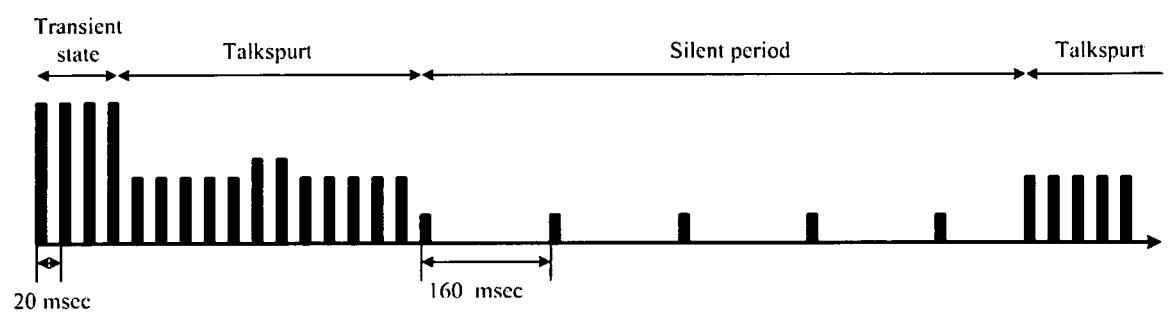
FIG. 1 is a schematic diagram of a conventional VoIP service model.
Figure 2:
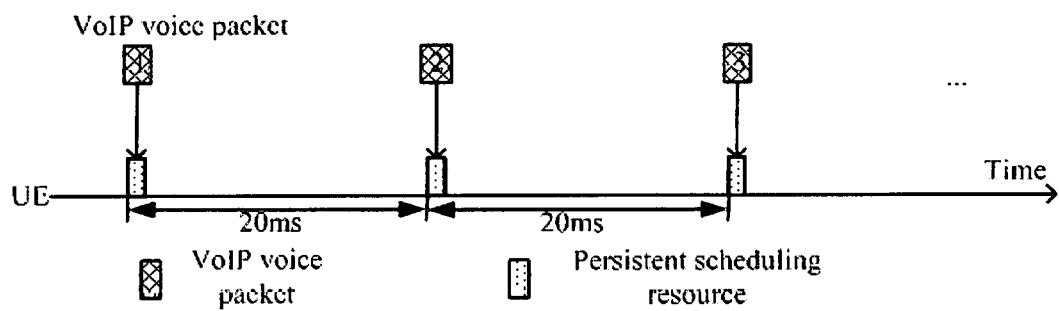
FIG. 2 is a schematic diagram of conventional allocation of and transmission over persistent scheduling resources.
Figure 3:
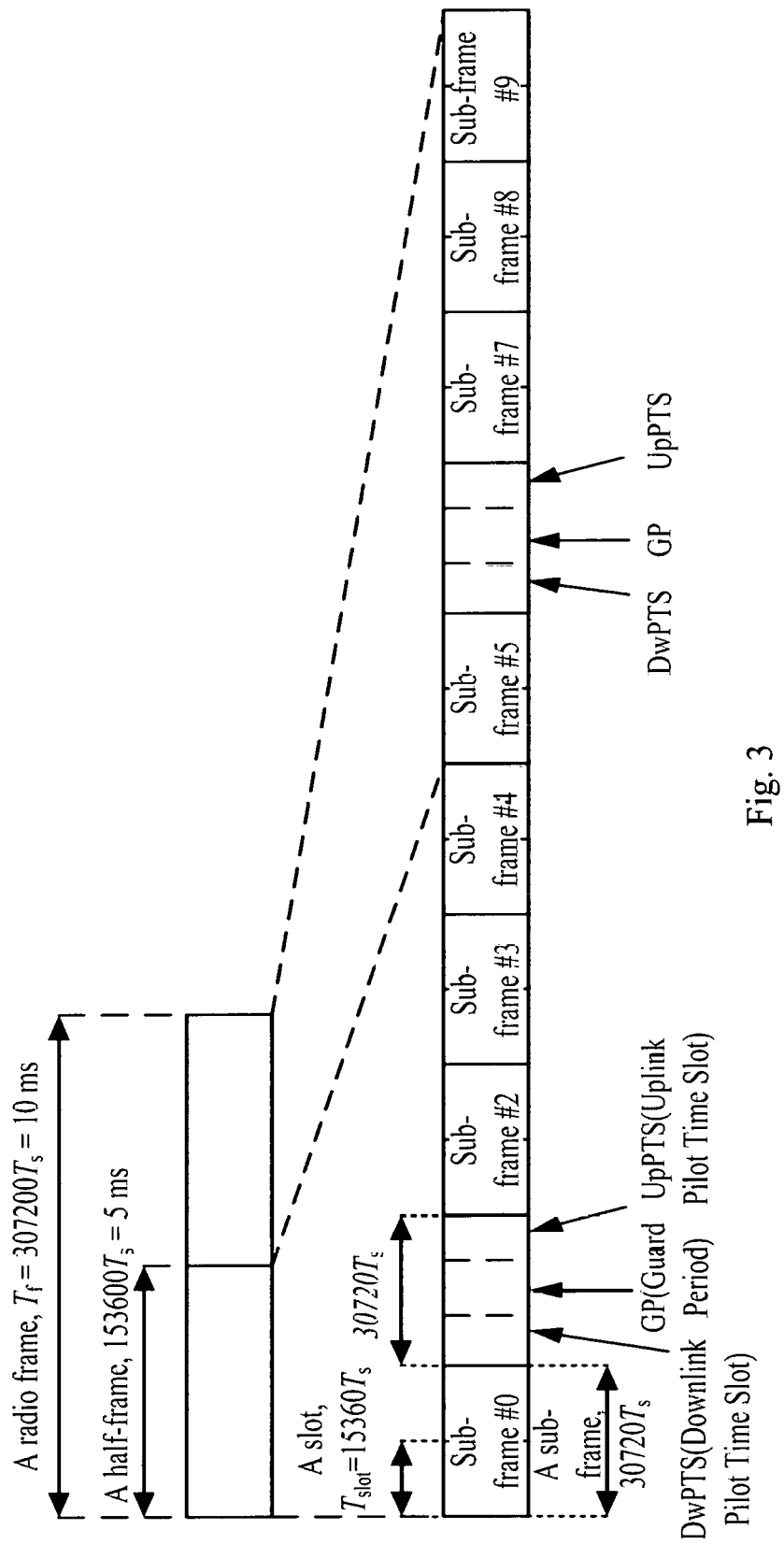
FIG. 3 is a schematic diagram of a conventional LTE TDD frame structure.
Figure 4:
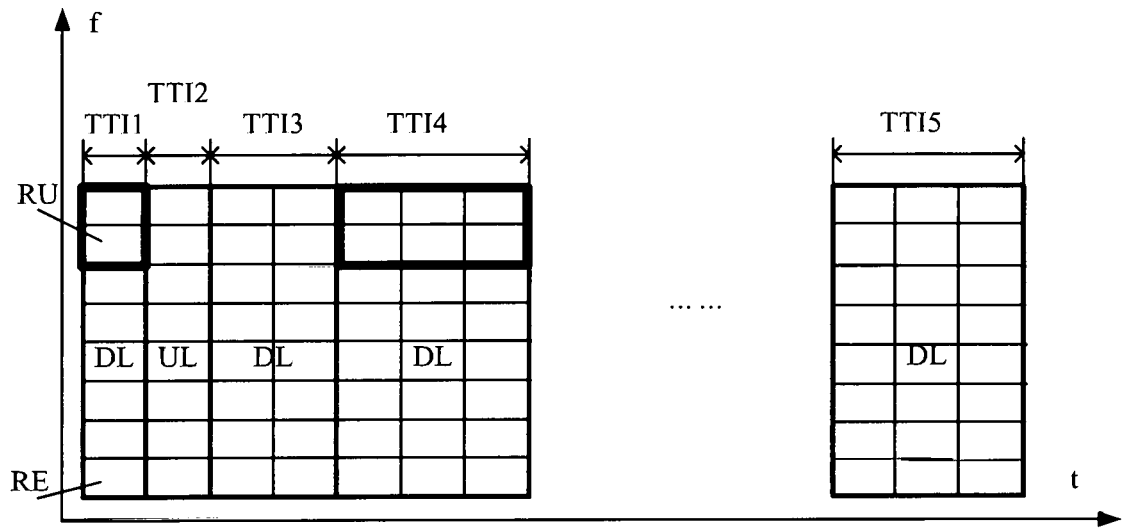
FIG. 4 is a schematic diagram of TTIs having different lengths according to an embodiment of the disclosure.

When making the invention, the inventor noticed that: the 5th Generation (5G) mobile communication system is an end to end ecosystem including various devices. The 5G mobile communication system needs to have a higher performance than the 4th Generation (4G) mobile communication system to support a user experienced data rate of 0.1 to 1 Gbps, 1 million connections per square kilometer, an end to end latency in millisecond level, a traffic volume density of tens of Tbps per square kilometer, mobility of more than 500 Km per hour, and a peak rate of tens of Gbps. The 5G mobile communication system demands low latency and high reliability, such as an air interface latency of 1 ms and an end to end latency in millisecond level. Accordingly, the idea of variable TTI length has been proposed for the 5G mobile communication system. FIG. 4 is a schematic diagram of TTIs having different lengths. As illustrated in FIG. 4, the abscissa represents the time domain, and the ordinate represents the frequency domain. Each square grid represents a resource element (RE), and resources are allocated as per resource unit (RU). A length of a TTI is an integer multiple of an elementary resource length of time (e.g., an integer multiple of a symbol). In FIG. 4, TTI1 is a downlink TTI and includes one symbol; TTI2 is an uplink TTI and includes one symbol; TTI3 is a downlink TTI and includes two symbols; TTI4 and TTI5 are downlink TTIs and each include three symbols.

In an LTE system, the resource allocation unit RU is PRB. A PRB occupies the entire length of a TTI in the time domain, and occupies a part of sub-carriers in the frequency domain. The 5G mobile communication system uses a new frame structure, and an RU may occupy a part of sub-carriers throughout the length of a TTI, just like the LTE PRB, or an RU may have a length shorter than the length of a TTI.

As such, when the TTI length is variable, available resources for each TTI might be different, and RUs for resource allocation may have different sizes, too. Therefore, the persistent scheduling scheme used by the LTE system, where time periodicity is fixed, the amount of resources and the transmission pattern are fixed, is no longer applicable. Moreover, there are the 5G system includes a variety of services, and needs to transmit more data packets through persistent scheduling. However, the existing technology provides no solution to persistent scheduling in a frame structure having a variable TTI length.

Accordingly, to solve the problem of how to perform persistent scheduling a frame structure having a variable TTI length, and the embodiments of the disclosure provide a solution to allocating persistent scheduling resources, and a solution to transmitting data over persistent scheduling resources, in a frame structure having a variable TTI length. In the solutions of the disclosure, a network side device allocates a list of resource allocation for persistent scheduling to a terminal, where the resource occupancy and transmission patterns of each persistent scheduling resource are related to available TTI lengths, and/or, are related to channel conditions. A transmitter and a receiver estimate a channel condition, and select a resource for transmitting each data packet, and/or, the transmitter and the receiver select the persistent scheduling resource according to an available TTI length at a transmission time. Particular embodiments of the disclosure are described below with reference to the drawings.

In the following description, implementations at a terminal and at a network-side entity are described, respectively, where resource allocation by the network side entity is described, data transmission between terminals or between a terminal and the network side entity is described, and then an implementation of cooperation between the terminal and the network side entity is further described for better understanding of the implementations of the solutions according to the embodiments of the disclosure. Such a description does not suggest that the terminal and the network side device must cooperate for an implementation, or must operate separately for an implementation. In fact, when the terminal and the network-side device operate separately from each other in respective implementations, respective problems at the terminal side and at the network side can be addressed, respectively, and when the terminal and the network-side device cooperate in an implementation, a better technical effect can be achieved.

Figure 5:
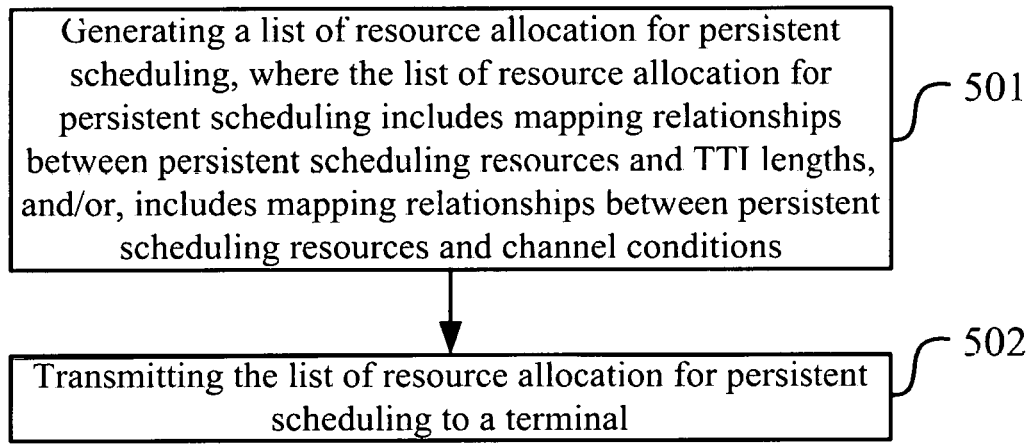
FIG. 5 is a schematic flow chart of a method for allocating persistent scheduling resources according to an embodiment of the disclosure.

FIG. 5 is a schematic flow chart of a method for allocating persistent scheduling resources according to an embodiment of the disclosure. As illustrated by FIG. 5, the method can include the following operations 501 and 502.

Operation 501: generating a list of resource allocation for persistent scheduling. The list of resource allocation for persistent scheduling includes mapping relationships between persistent scheduling resources and TTI lengths, and/or, includes mapping relationships between persistent scheduling resources and channel conditions.

Operation 502: transmitting the list of resource allocation for persistent scheduling to a terminal.

In an implementation, the persistent scheduling resources are allocated by a network side device. The network side device allocates a plurality of groups of persistent scheduling resources to the terminal, and creates a list of persistent scheduling resources, upon determining that persistent scheduling resources are to be allocated to the terminal. Each allocated persistent scheduling resource corresponds to a TTI length, and/or, corresponds to a channel condition. Such a list is called to the list of resource allocation for persistent scheduling herein, but the mapping relationships are not be limited to the form of a list. In fact, the mapping relationships between each persistent scheduling resource and a TTI length, and/or, between each persistent scheduling resource and a channel condition, can be expressed in any form. The list is described herein only to facilitate those skilled in the art to understand the disclosure, but the disclosure does not make limitation to the form of the mapping relationships.

In an implementation, the mapping relationships can be expressed in the list depicted in Table 2 as an example.

TABLE 2

An example of the list of resource allocation for persistent scheduling

| Resource Number | Transmission Resource | TTI Length (optional) | Channel Condition (optional) |
|---|---|---|---|
| 1 | Resource 1 | TTI Length 1 | |
| 2 | Resource 2 | TTI Length 2 | |
| ... | | | |

In an implementation, each persistent scheduling resource can include one or a combination of the following items: a transmission direction, a periodicity, a resource position, an MCS, and an activation state.

Taking Table 2 as an example, the contents of Table 2 are as follows.

1) The Column of Transmission Resource

This column can include a part or all of the following items so that a transmission resource can be uniquely determined: a transmission direction, e.g., uplink, downlink, transmission between Device to Device (D2D) paired UEs, and etc.; a periodicity, which typically matches a periodicity of the service data arrival, and different periodicities might have different lengths, be configured with different time-frequency resources, or be configured with different transmission parameters, where in an implementation, as for TDD, if a TDD direction differs from a desirable transmission direction at some point in a periodicity, then data is transmitted by default in a next TTI in which the TDD direction is in conformity the desirable transmission direction; a resource position, which is related to a resource allocation scheme; an MCS; and an activation state, e.g., automatic activation upon arrival of traffic, activation when a specific instruction, such as a downlink activation command, or an uplink scheduling request, is transmitted, and etc.

Figure 6:
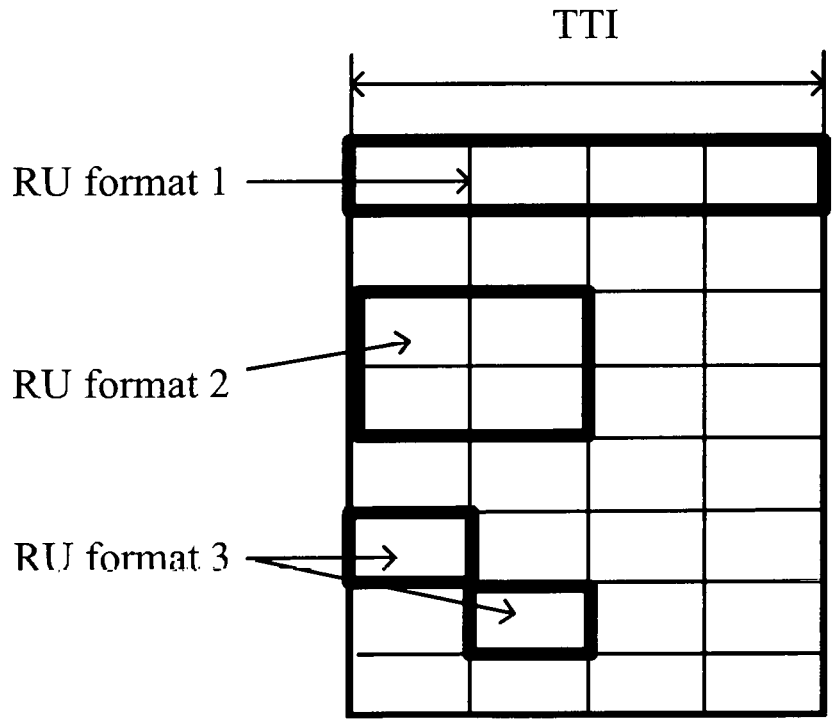
FIG. 6 is a schematic diagram of an RU pattern according to an embodiment of the disclosure.

In an implementation, a resource position indication scheme is related to a resource allocation unit RU. FIG. 6 is a schematic diagram of an RU format. As an example, FIG. 6 illustrates three different RU formats denoted by boxes having thick black borders. In the RU format 1, an RU occupies an entire TTI in the time domain, and occupies a part of sub-carriers in the frequency domain. In the RU format 2, an RU occupies a part of consecutive REs in the time and frequency domains, but does not occupy the entire TTI in the time domain. In the RU format 3, an RU occupies one or more discrete REs in a specific pattern.

Accordingly, a resource indication pattern can include a start position and an end position (e.g., the RU format 1); a start position and the number of RUs (e.g., allocation of consecutive sub-carriers in the RU format 1 and in the RU format 2); or, allocated RU positions or numbers (e.g., the RU format 3).

2) The Column of TTI Length

For example, a TTI length may be one symbol or N symbols.

3) The Column of Channel Condition

For example, channel quality threshold is set, and a corresponding transmission resource is allocated within a specific range of channel qualities. An MCS of a higher level, which uses fewer physical resources to transmit data, can be used when the channel quality is better.

In an implementation, the terminal is a terminal which needs to transmit service data over persistent scheduling resources.

In an implementation, the mapping relationships are determined according to one or a combination of following factors: a requirement for different TTI lengths, optional TTI lengths, and air-interface resources allocated for persistent scheduling.

In an implementation, the list of resource allocation for persistent scheduling is transmitted to the terminal in a unicast mode. Or, the list of resource allocation for persistent scheduling is transmitted to a group of terminals including the above-mentioned terminal in one or more control commands.

An example embodiment of the method for allocating persistent scheduling resources is described below.

First Embodiment

An implementation of allocating a list of resource allocation for persistent scheduling by the network side device is described in this embodiment.

At the first operation, the network side device determines one or more terminals for which persistent scheduling resources are to be allocated. The network side device makes such a determination on the basis of service data of the one or more terminals, where the service data needs to be transmitted over persistent scheduling resources. For example, the service data can be periodical small data packets such as periodically reported data of VoIP, or of Machine Type Communication (MTC). And at the first operation, the network side device also determines a periodicity, a data packet size, a transmission direction (downlink, uplink, or, D2D) and etc., for transmitting service data over the persistent scheduling resources.

At the second operation, the network side device determines a requirement for different TTI lengths, optional TTI lengths, and air-interface resources allocated for persistent scheduling, and creates a list of resource allocation for persistent scheduling indicating persistent scheduling resources (scheduling periodicities, resource positions, transmission patterns, and etc.), and, corresponding TTI lengths and/or corresponding channel qualities.

At the third operation, the network side device transmits the list of resource allocation for persistent scheduling to the one or more terminals for their subsequent transmission over the persistent scheduling resources. The list can be transmitted to the one or more terminals in a unicast mode, or can be transmitted to a group of terminals which are the above-mentioned one or more terminals in one or more control commands.

An implementation of data transmission based on the list of resource allocation for persistent scheduling is described below. While data is transmitted over persistent scheduling resources, a transmitter determines a specific transmission resource and a specific transmission pattern according to the current TTI length or according to the current channel condition at a transmission time occasion corresponding to a periodicity of persistent scheduling resources, and transmits data; and a receiver receives the data according to a same rule. Data transmission between a terminal and a network side device and between one terminal and another is described below, respectively.

Figure 7:
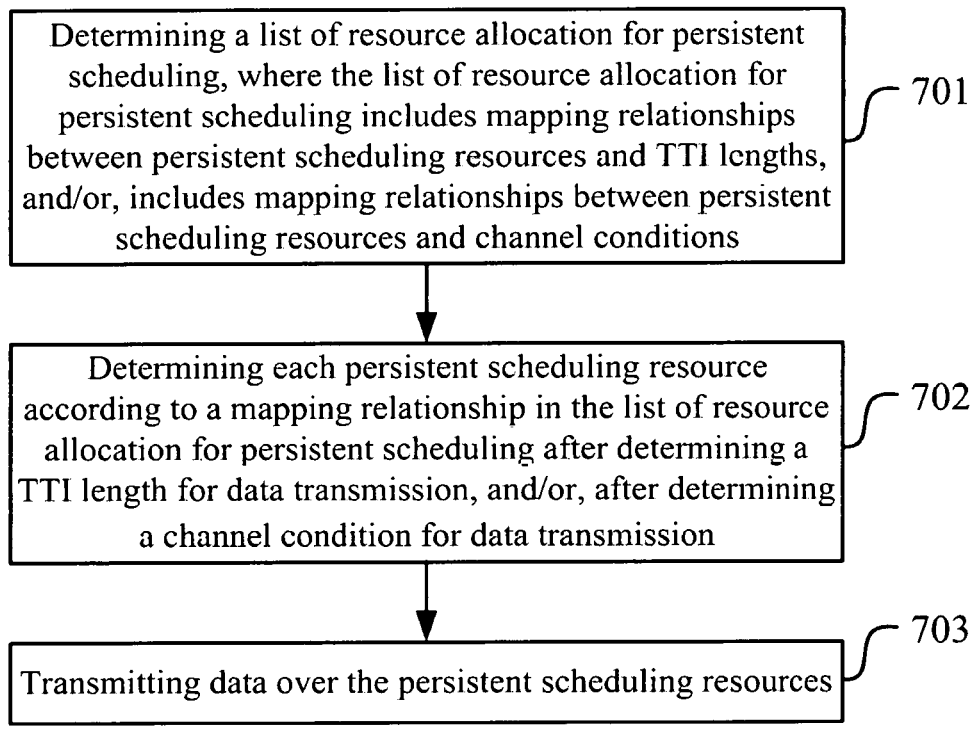
FIG. 7 is a schematic flow chart of a method for transmitting data over persistent scheduling resources according to an embodiment of the disclosure.

FIG. 7 is a schematic flow chart of a method for data transmission over persistent scheduling resources according to an embodiment of the disclosure. As illustrated by FIG. 7, the method can include the following operations 701-703.

Operation 701: determining a list of resource allocation for persistent scheduling. The list of resource allocation for persistent scheduling includes mapping relationships between persistent scheduling resources and TTI lengths, and/or, includes mapping relationships between persistent scheduling resources and channel conditions.

Operation 702: determining each persistent scheduling resource according to a mapping relationship in the list of resource allocation for persistent scheduling after determining a TTI length for data transmission, and/or, after determining a channel condition for data transmission.

Operation 703: transmitting data over the persistent scheduling resources.

Implementations of determining the persistent scheduling resource according to the mapping relationships in the list of resource allocation for persistent scheduling after determining the TTI length for data transmission in the operation 702 are described below.

In an implementation, a transmitter and a receiver each determine a persistent scheduling resource, according to a correspondence relationship between a TTI length and a transmission resource in the list of resource allocation for persistent scheduling at a time occasion corresponding to each periodicity of persistent scheduling. Each TTI length is configured semi-statically or dynamically by the network side device.

Figure 8:
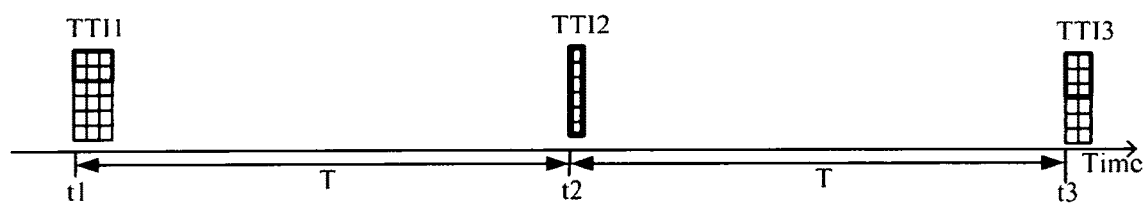
FIG. 8 is a schematic diagram of a first example of selecting persistent scheduling resources according to TTI lengths.

FIG. 8 is a schematic diagram of a first example of selecting persistent scheduling resources according to TTI lengths. As illustrated by FIG. 8, resources for data transmission each time are denoted by boxes having thick black borders. For example, each persistent scheduling resource occupies six REs in FIG. 8.

Implementations of determining each persistent scheduling resource according to a mapping relationship in the list of resource allocation for persistent scheduling after determining a channel condition for data transmission in the operation 702 are described below.

In the implementations, a transmitter and a receiver each determines a persistent scheduling resource from the list of resource allocation for persistent scheduling according to a channel condition at a time occasion corresponding to each periodicity of persistent scheduling. The channel condition can be determined as follows.

1. Downlink Transmission from the Network Side Device to the Terminal

1) To determine a persistent scheduling resource for downlink transmission from the network side device to the terminal, the channel condition is determined by the terminal according to a downlink CQI and is determined by the network side device according to the CQI fed back by the terminal.

Particularly, at a first operation, the terminal feeds back a downlink CQI. Different CQI levels correspond to different resource allocation schemes. At a second operation, the network side device determines a resource and a transmission pattern of downlink persistent scheduling according to the CQI fed back by the terminal. At a third operation, the network side device and the terminal transmit and receive data according to the selected resource and transmission pattern of persistent scheduling.

2) To determine the persistent scheduling resource for downlink transmission from the network side device to the terminal, the channel condition is determined by the network side device according to downlink channel quality derived from channel quality measurement performed by the network side device based on an uplink pilot signal or uplink data transmitted by the terminal, and is determined by the terminal according to a measurement of downlink channel quality by the terminal.

Particularly, at a first operation, the network side device measures uplink channel quality based on the uplink pilot signal or the uplink data transmitted by the terminal (the uplink pilot signal or uplink transmission is not necessarily for persistent scheduling), estimates the downlink channel quality according to the uplink channel quality as per channel reciprocity, and searches the list of resource allocation for persistent scheduling for a persistent scheduling resource corresponding to the downlink channel quality. At a second operation, the terminal searches the list of resource allocation for persistent scheduling for the persistent scheduling resource corresponding to the measured downlink channel quality. At a third operation, the network side device and the terminal transmit and receive data according to the selected resource and transmission pattern of persistent scheduling.

2. Uplink Transmission from the Terminal to the Network Side Device

1) To determine a persistent scheduling resource for uplink transmission from the terminal to the network device, the channel condition is determined by the terminal according to uplink channel quality derived from measurement of the downlink channel quality by the terminal, and is determined by the network side device according to the CQI fed back by the terminal.

Particularly, at a first operation, the terminal measures the downlink channel quality, estimates the uplink channel quality as per the channel reciprocity, and selects a persistent scheduling resource from the list of resource allocation for persistent scheduling according to the estimated uplink channel quality. At a second operation, the network side device selects the persistent scheduling resource from the list of resource allocation for persistent scheduling as per the channel reciprocity according to the CQI fed back by the terminal. At a third operation, the terminal and the network side device transmit and receive data according to the selected resource and transmission pattern of persistent scheduling.

2) To determine the persistent scheduling resource for uplink transmission from the terminal to the network device, the channel condition is determined by the terminal according to the uplink channel quality derived from measurement of the downlink channel quality by the terminal, and is determined by the network side device according to the channel quality measurement performed by the network side device based on the uplink pilot signal or the uplink data transmitted by the terminal.

Particularly, at a first operation, the terminal measures the downlink channel quality, estimates the uplink channel quality as per the channel reciprocity, and selects a persistent scheduling resource from the list of resource allocation for persistent scheduling according to the estimated uplink channel quality. At a second operation, the network side device measures the uplink channel quality based on the uplink pilot signal or the uplink data transmitted by the terminal, and selects the persistent scheduling resources from the list of resource allocation for persistent scheduling according to the measured uplink channel quality. At a third operation, the terminal and the network side device transmit and receive data according to the selected resource and transmission pattern of persistent scheduling.

3) To determine the persistent scheduling resource for uplink transmission from the terminal to the network device, the channel condition is determined by the terminal according to feedback of the network side device on the uplink channel quality measurement performed by the network side device based on the uplink pilot signal or the uplink data transmitted by the terminal, and is determined by the network side device according to the channel quality measurement performed by the network side device based on the uplink pilot signal or the uplink data transmitted by the terminal.

In an implementation, two devices communicate with each other can be referred to as a transmitter and a receiver according to the circumstances such as transmission between D2D terminals, or transmission between a terminal and a base station. Then the channel condition can be determined as follows.

The channel condition is determined by the receiver according to measurement of quality of a channel from a transmitter to the receiver performed by the receiver, and is determined by the transmitter according to feedback of the receiver on the measurement of the quality of the channel from a transmitter to the receiver.

Or, the channel condition is determined by the receiver according to the measurement of the quality of the channel from the transmitter to the receiver performed by the receiver, and is determined by the transmitter through channel reciprocity according to measurement of quality of a channel from the receiver to the transmitter performed by the transmitter.

The following embodiments using the list of resource allocation for persistent scheduling to transmit data describe example implementations relating to the transmitter and the receiver.

Implementations of determining the persistent scheduling resource according to the mapping relationships in the list of resource allocation for persistent scheduling after determining the TTI length for data transmission and the channel condition in the operation 702 are described below.

In the implementations, the transmitter and the receiver each determine the amount of resources and a transmission pattern for data transmission, according to a measured channel quality, and determine a transmission resource according to a TTI length at a transmission time, the amount of resources and the transmission pattern. This implementation is more applicable to a scenario where the length of a TTI is dynamically variable.

Figure 9:
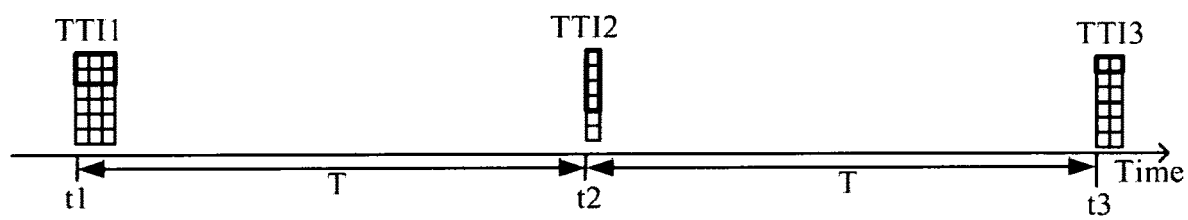
FIG. 9 is a schematic diagram of a second example of selecting persistent scheduling resources according to TTI lengths.

FIG. 9 is a schematic diagram of a second example of selecting persistent scheduling resources according to TTI lengths. As illustrated by FIG. 9, the TTI length at a time t1, TTI1, is three symbols, and the transmission pattern MCS1 is selected according to channel quality, where each persistent scheduling resource occupies six RE resources; the TTI length at a time t2, TTI2, is one symbol, and the transmission pattern MCS2 is selected according to channel quality, where each persistent scheduling resource occupies four RE resources; and the TTI length at a time t3, TTI3, is two symbols, and the transmission pattern MCS3 is selected according to channel quality, where each persistent scheduling resource occupies two RE resources.

Embodiments below describe how to perform data transmission by using the list of resource allocation for persistent scheduling. Resource selection, and data transmission and reception, in the downlink and the uplink between the network side device and the terminal, and in D2D transmission between one terminal and another are described in the second embodiment. The third and fourth embodiments describe resource selection, and data transmission and reception, by only referring to the transmitter and the receiver. Details of the operating environment are described in the second embodiment. The second embodiment relates to an example of selecting a persistent scheduling resource according to a TTI length, for data transmission. The third embodiment relates to an example of selecting the persistent scheduling resource according to channel quality, for data transmission, and the fourth embodiment relates to an example of selecting the resources persistent scheduling according to the TTI length and according to the channel quality, for data transmission.

Second Embodiment

This embodiment relates to implementations of selecting a persistent scheduling resource according to a TTI length, for data transmission.

Before performing persistent scheduling, the network side device configures a list of persistent scheduling resources for the terminal, where each configured persistent scheduling resource corresponds to a different TTI length.

1. Downlink Transmission (from the Network Side to the Terminal)

At the Network Side

At a first operation, the network side device determines a transmission time according to a periodicity of persistent scheduling, and if a TTI corresponding to the periodicity is not a downlink TTI, then the network side device determines a nearest downlink TTI following the TTI corresponding to the periodicity as a transmission TTI.

At a second operation, the network side device determines the length of the transmission TTI, and determines a persistent scheduling resource for transmission, according to a correspondence relationship between the TTI length and the persistent scheduling resource in the list of persistent scheduling resources.

At a third operation, the network side device transmits data over the determined persistent scheduling resource in the transmission TTI.

At the Terminal Side

At a first operation, the terminal determines the transmission time according to the periodicity of persistent scheduling, and if the TTI corresponding to the periodicity is not a downlink TTI, then the terminal determines the nearest downlink TTI following the TTI corresponding to the periodicity as the transmission TTI.

At a second operation, the terminal determines the length of the transmission TTI, and determines the persistent scheduling resource for transmission according to the correspondence relationship between the TTI length and the persistent scheduling resource in the list of persistent scheduling resources. This is how the terminal determines the length of the transmission TTI: the length of the transmission TTI is statically, semi-statically, or dynamically configured by the network side device, and is signaled by the network side device.

At a third operation, the terminal receives data over the determined persistent scheduling resource in the transmission TTI.

2. Uplink Transmission (from the Terminal to the Network Side)

At the Terminal Side

At a first operation, the terminal determines a transmission time according to a periodicity of persistent scheduling, and if a TTI corresponding to the periodicity is not an uplink TTI, then the terminal determines a nearest uplink TTI following the TTI corresponding to the periodicity as a transmission TTI.

At a second operation, the terminal determines the length of the transmission TTI, and determines a persistent scheduling resource for transmission according to a correspondence relationship between the TTI length and the persistent scheduling resource in the list of persistent scheduling resources. This is how the terminal determines the length of the transmission TTI: the length of the transmission TTI is statically, semi-statically, or dynamically configured by the network side device, and is signaled by the network side device At a third operation, the terminal transmits data over the determined persistent scheduling resource in the transmission TTI.

At the Network Side

At a first operation, the network side device determines the transmission time according to the periodicity of persistent scheduling, and if the TTI corresponding to the periodicity is not an uplink TTI, then the transmitting point determines the nearest uplink TTI following the TTI corresponding to the periodicity as the transmission TTI.

At a second operation, the network side device determines the length of the transmission TTI, and determines the persistent scheduling resource for transmission according to the correspondence relationship between the TTI length and the persistent scheduling resource in the list of persistent scheduling resources.

At a third operation, the network side device receives data over the determined persistent scheduling resource in the transmission TTI.

3. D2D Transmission (from a Terminal 1 to a Terminal 2)

At the Terminal 1 (a Transmitter)

At a first operation, the terminal 1 determines a transmission time according to a periodicity of persistent scheduling, and if a TTI corresponding to the periodicity is not an available D2D transmission TTI, then the terminal 1 determines a nearest available D2D transmission TTI following the TTI corresponding to the periodicity as a transmission TTI.

At a second operation, the terminal 1 determines the length of the transmission TTI, and determines a persistent scheduling resource for transmission according to a correspondence relationship between the TTI length and the persistent scheduling resource in the list of persistent scheduling resources. This is how the terminal determines the length of the transmission TTI: the length of the transmission TTI is statically, semi-statically, or dynamically configured by the network side device, and is signaled by the network side device.

At a third operation, the terminal 1 transmits data over the determined persistent scheduling resource in the transmission TTI.

At the Terminal 2 (a Receiver)

At a first operation, the terminal 2 determines a transmission time according to the periodicity of persistent scheduling, and if the TTI corresponding to the periodicity is not an available D2D transmission TTI, then the terminal 2 determines the nearest available D2D transmission TTI following the TTI corresponding to the periodicity as the transmission TTI.

At a second operation, the terminal 2 determines the length of the transmission TTI, and determines the persistent scheduling resource for transmission according to the correspondence relationship between the TTI length and the persistent scheduling resource in the list of persistent scheduling resources. This is how the terminal determines the length of the transmission TTI: the length of the transmission TTI is statically, semi-statically, or dynamically configured by the network side device, and is signaled by the network side device.

At a third operation, the terminal 2 receives data over the determined persistent scheduling resource in the transmission TTI.

Third Embodiment

This embodiment relates to an implementation of selecting a persistent scheduling resource according to channel quality, for data transmission.

Before performing persistent scheduling, the network side device configures a list of persistent scheduling resources for the terminal, where each configured persistent scheduling resource corresponds to a different channel quality.

At the Transmitter

At a first operation, the transmitter determines a transmission time according to a periodicity of persistent scheduling, and if a TTI corresponding to the periodicity is not a TTI of a corresponding transmission direction, then the transmitter determines a nearest available TTI following the TTI corresponding to the periodicity as a transmission TTI.

At a second operation, the transmitter measures transmission quality of a channel from the receiver to the transmitter, and estimates transmission quality of a channel from the transmitter to the receiver as per the channel reciprocity; or the transmitter determines the transmission channel quality according to the channel quality fed back by the receiver.

At a third operation, the transmitter determines a persistent scheduling resource for transmission, according to a correspondence relationship between the channel quality estimated or determined at the second operation and the persistent scheduling resource in the list of persistent scheduling resources.

At a fourth operation, the transmitter transmits data over the determined persistent scheduling resource in the transmission TTI.

At the Receiver

At a first operation, the receiver determines the transmission time according to the periodicity of persistent scheduling, and if the TTI corresponding to the periodicity is not the TTI of the corresponding transmission direction, then the receiver determines the nearest available TTI following the TTI corresponding to the periodicity as the transmission TTI.

At a second operation, the receiver measures transmission quality of the channel from the transmitter to the receiver, or estimates transmission channel quality according to channel quality fed back by the transmitter as per the channel reciprocity.

At a third operation, the receiver determines the persistent scheduling resource for transmission, according to the correspondence relationship between the channel quality estimated or determined at the second operation and the persistent scheduling resource in the list of persistent scheduling resources.

At a fourth operation, the receiver receives data over the determined persistent scheduling resource in the transmission TTI.

Fourth Embodiment

This embodiment relates to an implementation of selecting a persistent scheduling resource according to a TTI length and according to channel quality, for data transmission.

Before performing persistent scheduling, the network side device configures a list of persistent scheduling resources, where each configured persistent scheduling resource corresponds to a different combination of a TTI length and channel quality.

At the Transmitter

At a first operation, the transmitter determines a transmission time according to a periodicity of persistent scheduling, and if a TTI corresponding to the periodicity is not a TTI of a corresponding transmission direction, then the transmitter determines a nearest available TTI following the TTI corresponding to the periodicity as a transmission TTI.

At a second operation, the transmitter measures transmission quality of a channel from the receiver to the transmitter, and estimates transmission quality of a channel from the transmitter to the receiver as per the channel reciprocity; or the transmitter determines the transmission channel quality according to the channel quality fed back by the opposite end. The transmitter can determine the amount of resources and a transmission pattern for persistent scheduling according to the channel quality.

At a third operation, the transmitter determines a TTI length of the transmission TTI, and searches the list of persistent scheduling resources for a persistent scheduling resource for transmission, according to the channel quality and the TTI length of the transmission TTI.

At a fourth operation, the transmitter transmits data over the determined persistent scheduling resource in the transmission TTI.

At the Receiver

At a first operation, the receiver determines the transmission time according to the periodicity of persistent scheduling, and if the TTI corresponding to the periodicity is not the TTI of the corresponding transmission direction, then the receiver determines the nearest available TTI following the TTI corresponding to the periodicity as the transmission TTI.

At a second operation, the receiver measures transmission quality of the channel from the transmitter to the receiver, or estimates transmission channel quality according to the channel quality fed back by the transmitter as per the channel reciprocity. The receiver can determine the amount of resources and the transmission pattern for persistent scheduling according to the channel quality.

At a third operation, the receiver determines the TTI length of the transmission TTI, and searches the list of persistent scheduling resources for the persistent scheduling resource for transmission, according to the channel quality and the TTI length of the transmission TTI.

At a fourth operation, the receiver receives data over the determined persistent scheduling resource in the transmission TTI.

Based upon the same inventive idea, embodiments of the disclosure further provide a device for allocating persistent scheduling resources, and a device for transmitting data over persistent scheduling resources. Since these devices address problems under a similar principle to the method for allocating persistent scheduling resources and the method for transmitting data over persistent scheduling resources, reference can be made to the implementations of the methods for implementations of these devices, and a repeated description thereof is omitted here.

Figure 10:
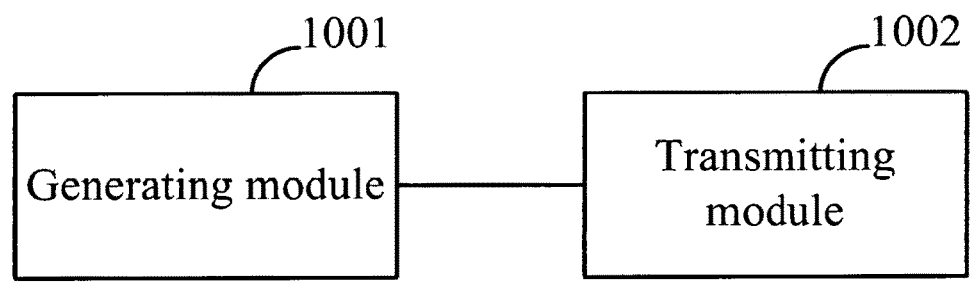
FIG. 10 is a schematic structural diagram of a device for allocating persistent scheduling resources according to an embodiment of the disclosure.

FIG. 10 is a schematic structural diagram of a device for allocating persistent scheduling resources according to an embodiment of the disclosure. As illustrated by FIG. 10, the device includes a generating module 1001 and a transmitting module 1002.

The generating module 1001 is configured to generate a list of resource allocation for persistent scheduling. The list of resource allocation for persistent scheduling includes mapping relationships between persistent scheduling resources and TTI lengths. And/or, the list of resource allocation for persistent scheduling includes mapping relationships between persistent scheduling resources and channel conditions.

The transmitting module 1002 is configured to transmit the list of resource allocation for persistent scheduling to a terminal.

In an implementation, the generating module is further configured to generate the list of resource allocation for persistent scheduling for the terminal, which needs to transmit service data over persistent scheduling resources.

In an implementation, the generating module is further configured to determine the mapping relationships according to one or a combination of following factors: a requirement for different TTI lengths, optional TTI lengths, and air-interface resources allocated for persistent scheduling.

In an embodiment, the transmitting module is further configured to: transmit the list of resource allocation for persistent scheduling to the terminals in a unicast mode; or, transmit the list of resource allocation for persistent scheduling to a group of terminals in one or more control commands.

In an embodiment, each of the persistent scheduling resources includes one or a combination of: a transmission direction, a periodicity, a resource position, an MCS, and an activation state.

Figure 11:
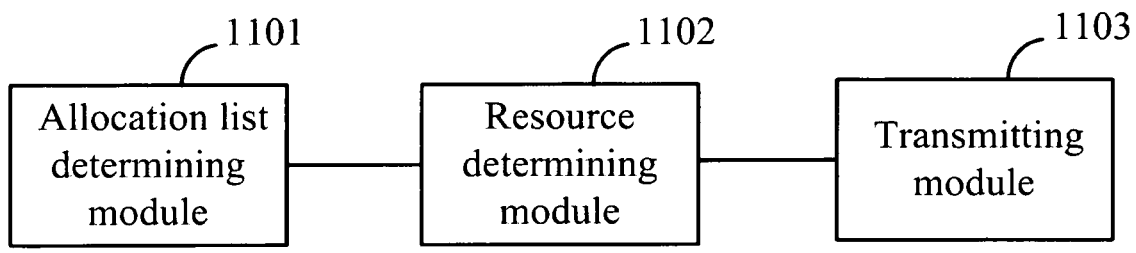
FIG. 11 is a schematic structural diagram of a device for transmitting data over persistent scheduling resources according to an embodiment of the disclosure.

FIG. 11 is a schematic structural diagram of a device for transmitting data over persistent scheduling resources according to an embodiment of the disclosure. As illustrated by FIG. 11, the device can include an allocation list determining module 1101, a resource determining module 1102 and a transmitting module 1103.

The allocation list determining module 1101 is configured to determine a list of resource allocation for persistent scheduling. The list of resource allocation for persistent scheduling includes mapping relationships between persistent scheduling resources and TTI lengths, and/or, includes mapping relationships between persistent scheduling resources and channel conditions.

The resource determining module 1102 is configured to determine each persistent scheduling resource according to a mapping relationship in the list of resource allocation for persistent scheduling after determining a TTI length for data transmission, and/or, after determining a channel condition for data transmission.

The transmitting module 1103 is configured to transmit data over the persistent scheduling resources.

In an embodiment, the resource determining module is further configured to use each TTI length configured semi-statically or dynamically by a network side device, when determining each persistent scheduling resource according to the mapping relationship in the list of resource allocation for persistent scheduling at a time occasion corresponding to each periodicity of persistent scheduling.

In an embodiment, the resource determining module is further configured to determine the channel condition as follows: the channel condition is determined by a terminal according to a downlink CQI and is determined by a network side device according to the CQI fed back by the terminal, to determine a persistent scheduling resource for downlink transmission from the network side device to the terminal; or, the channel condition is determined by the network side device according to downlink channel quality derived from channel quality measurement performed by the network side device based on an uplink pilot signal or uplink data transmitted by the terminal, and is determined by the terminal according to a measurement of downlink channel quality by the terminal, to determine the persistent scheduling resource for downlink transmission from the network side device to the terminal; or, the channel condition is determined by the terminal according to uplink channel quality derived from measurement of the downlink channel quality by the terminal, and is determined by the network side device according to the CQI fed back by the terminal, to determine a persistent scheduling resource for uplink transmission from the terminal to the network device; or, the channel condition is determined by the terminal according to the uplink channel quality derived from measurement of the downlink channel quality by the terminal, and is determined by the network side device according to the channel quality measurement performed by the network side device based on the uplink pilot signal or the uplink data transmitted by the terminal, to determine the persistent scheduling resource for uplink transmission from the terminal to the network device; or, the channel condition is determined by the terminal according to feedback of the network side device on the uplink channel quality measurement performed by the network side device based on the uplink pilot signal or the uplink data transmitted by the terminal, and is determined by the network side device according to the channel quality measurement performed by the network side device based on the uplink pilot signal or the uplink data transmitted by the terminal, to determine the persistent scheduling resource for uplink transmission from the terminal to the network device.

In an embodiment, the resource determining module is further configured to determine the channel condition as follows: the channel condition is determined by a receiver according to measurement of quality of a channel from a transmitter to the receiver performed by the receiver, and is determined by the transmitter according to feedback of the receiver on the measurement of the quality of the channel from a transmitter to the receiver; or the channel condition is determined by the receiver according to the measurement of the quality of the channel from the transmitter to the receiver performed by the receiver, and is determined by the transmitter through channel reciprocity according to measurement of quality of a channel from the receiver to the transmitter performed by the transmitter.

In an embodiment, each persistent scheduling resource includes one or a combination of: a transmission direction, a periodicity, a resource position, an MCS, and an activation state.

For the sake of convenience, the devices are described above by dividing into different functional modules or into different functional units. Of course, functions of different modules or units can be implemented by same or different software or hardware.

The technical solutions according to the embodiments of the disclosure can be implemented as follows.

Figure 12:
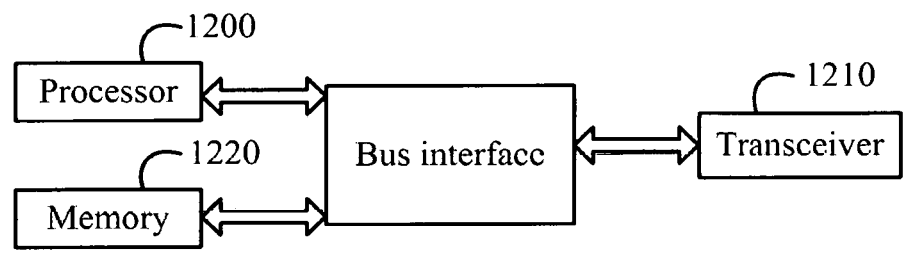
FIG. 12 is a schematic structural diagram of a base station according to an embodiment of the disclosure.

FIG. 12 is a schematic structural diagram of a base station according to an embodiment of the disclosure. As illustrated by FIG. 12, the base station includes a processor 1200, a transceiver 1210 and a memory 1220.

The processor 1200 is configured to read a program in the memory 1220 to: generate a list of resource allocation for persistent scheduling. The list of resource allocation for persistent scheduling includes mapping relationships between persistent scheduling resources and TTI lengths, and/or, includes mapping relationships between persistent scheduling resources and channel conditions.

The transceiver 1210 is configured to transmit and receive data under control of the processor 1200 to: transmit the list of resource allocation for persistent scheduling to a terminal.

In an implementation, the terminal is a terminal which needs to transmit service data over persistent scheduling resources.

In an implementation, the mapping relationships are determined according to one or a combination of following factors: a requirement for different TTI lengths, optional TTI lengths, and air-interface resources allocated for persistent scheduling.

In an implementation, the list of resource allocation for persistent scheduling is transmitted to the terminal in a unicast mode, or the list of resource allocation for persistent scheduling is transmitted to a group of terminals including the terminal mentioned above in one or more control commands.

In an embodiment, each of the persistent scheduling resources includes one or a combination of a transmission direction, a periodicity, a resource position, an MCS, and an activation state.

In FIG. 12, the bus architecture can include any number of interconnecting buses and bridges to link together various circuits including one or more processors represented by the processor 1200 and one or more memories represented by the memory 1220. The bus architecture can further link together various other circuits such as a peripheral device, a manostat, and a power management circuit, all of which are well known in the art, so a further description thereof is omitted in this context. The bus interface serves as an interface. The transceiver 1210 can be a plurality of elements, i.e., the transceiver can include a transmitter and a receiver, providing units for communication with various other devices over a transmission medium. The processor 1200 is responsible for managing the bus architecture and performing normal processes, and the memory 1220 can store data for use by the processor 1200 in performing operations.

A device for transmitting data over persistent scheduling resources is described below, and although the device is exemplified as a terminal, this solution also is also applicable to a network-side device such as a base station. In fact, the solution can be applicable to any device having a list of resource allocation for persistent scheduling.

Figure 13:
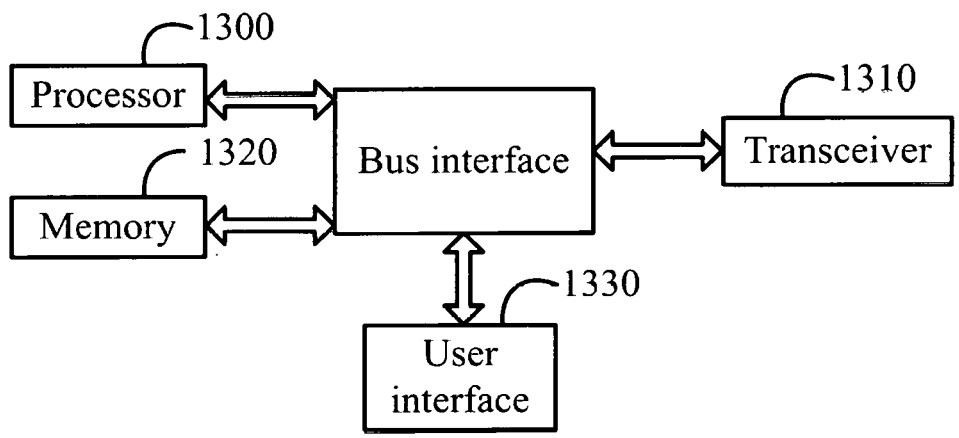
FIG. 13 is a schematic structural diagram of a terminal according to an embodiment of the disclosure.

FIG. 13 is a schematic structural diagram of a terminal according to an embodiment of the disclosure. As illustrated by FIG. 13, the terminal can include a processor 1300, a memory 1320 and a transceiver 1310.

The processor 1300 is configured to read a program in the memory 1320 to: determine a list of resource allocation for persistent scheduling, where the list of resource allocation for persistent scheduling includes mapping relationships between persistent scheduling resources and TTI lengths, and/or, includes mapping relationships between persistent scheduling resources and channel conditions; and, determine each persistent scheduling resource according to a mapping relationship in the list of resource allocation for persistent scheduling after determining a TTI length for data transmission, and/or, after determining a channel condition for data transmission.

The transceiver 1310 is configured to transmit and receive data under control of the processor to: transmit data over the persistent scheduling resources.

In an implementation, the processor is further configured to use each TTI length configured semi-statically or dynamically by a network side device, when determining each persistent scheduling resource according to the mapping relationship in the list of resource allocation for persistent scheduling at a time occasion corresponding to each periodicity of persistent scheduling.

In an embodiment, the processor is further configured to determine the channel condition as follows: the channel condition is determined by a terminal according to a downlink CQI and is determined by a network side device according to the CQI fed back by the terminal, to determine a persistent scheduling resource for downlink transmission from the network side device to the terminal; or, the channel condition is determined by the network side device according to downlink channel quality derived from channel quality measurement performed by the network side device based on an uplink pilot signal or uplink data transmitted by the terminal, and is determined by the terminal according to a measurement of downlink channel quality by the terminal, to determine the persistent scheduling resource for downlink transmission from the network side device to the terminal; or, the channel condition is determined by the terminal according to uplink channel quality derived from measurement of the downlink channel quality by the terminal, and is determined by the network side device according to the CQI fed back by the terminal, to determine a persistent scheduling resource for uplink transmission from the terminal to the network device; or, the channel condition is determined by the terminal according to the uplink channel quality derived from measurement of the downlink channel quality by the terminal, and is determined by the network side device according to the channel quality measurement performed by the network side device based on the uplink pilot signal or the uplink data transmitted by the terminal, to determine the persistent scheduling resource for uplink transmission from the terminal to the network device; or, the channel condition is determined by the terminal according to feedback of the network side device on the uplink channel quality measurement performed by the network side device based on the uplink pilot signal or the uplink data transmitted by the terminal, and is determined by the network side device according to the channel quality measurement performed by the network side device based on the uplink pilot signal or the uplink data transmitted by the terminal, to determine the persistent scheduling resource for uplink transmission from the terminal to the network device.

In an embodiment, the processor is further configured to determine the channel condition as follows: the channel condition is determined by a receiver according to measurement of quality of a channel from a transmitter to the receiver performed by the receiver, and is determined by the transmitter according to feedback of the receiver on the measurement of the quality of the channel from a transmitter to the receiver; or the channel condition is determined by the receiver according to the measurement of the quality of the channel from the transmitter to the receiver performed by the receiver, and is determined by the transmitter through channel reciprocity according to measurement of quality of a channel from the receiver to the transmitter performed by the transmitter.

In an implementation, each persistent scheduling resource includes one or a combination of: a transmission direction, a periodicity, a resource position, an MCS, and an activation state.

In FIG. 13, the bus architecture can include any number of interconnecting buses and bridges to link together various circuits including one or more processors represented by the processor 1300 and one or more memories represented by the memory 1320. The bus architecture can further link together various other circuits such as a peripheral device, a manostat, and a power management circuit, all of which are well known in the art, so a further description thereof is omitted in this context. The bus interface serves as an interface. The transceiver 1310 can be a plurality of elements, i.e., the transceiver 1310 can include a transmitter and a receiver, providing units for communication with various other devices over a transmission medium. For different terminals, the user interface 1330 can also be an interface via which one or more devices can be connected externally and/or internally, where the connected one or more devices include but are not be limited to a keypad, a display, a loudspeaker, a microphone, a joystick, and etc.

The processor 1300 is responsible for managing the bus architecture and performing normal processes, and the memory 1320 can store data for use by the processor 1300 in performing operations.

In summary, in the technical solutions according to the embodiments of the disclosure, the list of resource allocation for persistent scheduling is allocated by the network side device to the terminal, where resource occupancy and a transmission pattern of each persistent scheduling resource are related to an available TTI length, and/or, are related to a channel condition. The transmitter estimates the channel condition, and selects a resource for transmitting each data packet according to the estimated channel condition, or selects a resource for persistent scheduling according to the available TTI length at the transmission time.

Furthermore, contents of the list of persistent scheduling resources, solutions to determining a resource according to a TTI length or according to channel quality, and solutions to determining a resource according a combination of a TTI length and channel quality, are provided above. With these solutions, persistent scheduling resources can be allocated in an effective way when the TTI length is variable.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for allocating persistent scheduling resources, comprising:
generating a list of resource allocation for persistent scheduling,
wherein the list of resource allocation for persistent scheduling comprises:
mapping relationships each between a persistent scheduling resource and a Transmission Time Interval (TTI) length, wherein each TTI length is less than or equal to 1 ms; or,
wherein the list of resource allocation for persistent scheduling comprises:
mapping relationships each between the persistent scheduling resource, the TTI length, and the channel condition, wherein each TTI length is less than or equal to 1 ms; and
transmitting the list of resource allocation for persistent scheduling to a terminal,
wherein at a transmission time occasion corresponding to a periodicity of persistent scheduling, the persistent scheduling resource is determined according to the mapping relationship in the list of resource allocation for persistent scheduling, after determining the TTI length to use for data transmission, or after determining the TTI length to use for data transmission and the channel condition to use for data transmission.

2. The method according to claim 1, wherein the mapping relationships are determined according to one or a combination of following factors:

a requirement for different TTI lengths, optional TTI lengths, and air-interface resources allocated for persistent scheduling.

3. The method according to claim 1, wherein transmitting the list of resource allocation for persistent scheduling to the terminal comprises:
   transmitting the list of resource allocation for persistent scheduling to the terminal in a unicast mode; or
   transmitting the list of resource allocation for persistent scheduling to a group of terminals in one or more control commands.

4. The method according to claim 1, wherein each of the persistent scheduling resources comprises one or a combination of:
   a transmission direction, a periodicity, a resource position, a Modulation and Coding Scheme (MCS), and an activation state.

5. A method for transmitting data over persistent scheduling resources, comprising:
   determining a list of resource allocation for persistent scheduling,
   wherein the list of resource allocation for persistent scheduling comprises:
   mapping relationships each between a persistent scheduling resource and a TTI length, wherein each TTI length is less than or equal to 1 ms; or,
   wherein the list of resource allocation for persistent scheduling comprises:
   mapping relationships each between the persistent scheduling resource and the TTI length and the channel condition, wherein each TTI length is less than or equal to 1 ms;
   determining, at a transmission time occasion corresponding to a periodicity of persistent scheduling, the persistent scheduling resource according to the mapping relationship in the list of resource allocation for persistent scheduling after determining the TTI length for data transmission, or, after determining the TTI length for data transmission and the channel condition for data transmission; and
   transmitting data over the persistent scheduling resources.

6. The method according to claim 5, wherein each TTI length is configured semi-statically or dynamically by a network side device, when each persistent scheduling resource is determined according to the mapping relationship in the list of resource allocation for persistent scheduling at a time occasion corresponding to each periodicity of persistent scheduling.

7. The method according to claim 5, wherein,
   the channel condition is determined by a terminal according to a downlink Channel Quality Indicator (CQI) and is determined by a network side device according to the CQI fed back by the terminal, to determine a persistent scheduling resource for downlink transmission from the network side device to the terminal; or, the channel condition is determined by the network side device according to downlink channel quality derived from channel quality measurement performed by the network side device based on an uplink pilot signal or uplink data transmitted by the terminal, and is determined by the terminal according to a measurement of downlink channel quality by the terminal, to determine the persistent scheduling resource for downlink transmission from the network side device to the terminal; or the channel condition is determined by the terminal according to uplink channel quality derived from measurement of the downlink channel quality by the terminal, and is determined by the network side device according to the CQI fed back by the terminal, to determine a persistent scheduling resource for uplink transmission from the terminal to the network device; or,
   the channel condition is determined by the terminal according to the uplink channel quality derived from measurement of the downlink channel quality by the terminal, and is determined by the network side device according to the channel quality measurement performed by the network side device based on the uplink pilot signal or the uplink data transmitted by the terminal, to determine the persistent scheduling resource for uplink transmission from the terminal to the network device; or,
   the channel condition is determined by the terminal according to feedback of the network side device on the uplink channel quality measurement performed by the network side device based on the uplink pilot signal or the uplink data transmitted by the terminal, and is determined by the network side device according to the channel quality measurement performed by the network side device based on the uplink pilot signal or the uplink data transmitted by the terminal, to determine the persistent scheduling resource for uplink transmission from the terminal to the network device.

8. The method according to claim 5, wherein,
   the channel condition is determined by a receiver according to measurement of quality of a channel from a transmitter to the receiver performed by the receiver, and is determined by the transmitter according to feedback of the receiver on the measurement of the quality of the channel from a transmitter to the receiver; or
   the channel condition is determined by the receiver according to the measurement of the quality of the channel from the transmitter to the receiver performed by the receiver, and is determined by the transmitter through channel reciprocity according to measurement of quality of a channel from the receiver to the transmitter performed by the transmitter.

9. The method according to claim 5, wherein each persistent scheduling resource comprises one or a combination of:
   a transmission direction, a periodicity, a resource position, an MCS, and an activation state.

10. A device for transmitting data over persistent scheduling resources, comprising:
    a transceiver;
    a memory storing one or more instructions; and
    a processor configured to execute the one or more instructions to:
    determine a list of resource allocation for persistent scheduling,
    wherein the list of resource allocation for persistent scheduling comprises:
    mapping relationships each between a persistent scheduling resource and a TTI length, wherein each TTI length is less than or equal to 1 ms; or,
    wherein the list of resource allocation for persistent scheduling comprises:
    mapping relationships each between the persistent scheduling resource and the TTI length and a channel condition, wherein each TTI length is less than or equal to 1 ms;
    determine, at a transmission time occasion corresponding to a periodicity of persistent scheduling, the persistent scheduling resource according to a mapping relationship in the list of resource allocation for persistent scheduling after determining the TTI length for data transmission, or, after determining the TTI length for data transmission and the channel condition for data transmission; and control the transceiver to transmit data over the persistent scheduling resources.

11. The device according to claim 10, wherein the processor is further configured to execute the one or more instructions to:

use each TTI length configured semi-statically or dynamically by a network side device, when determining each persistent scheduling resource according to the mapping relationship in the list of resource allocation for persistent scheduling at a time occasion corresponding to each periodicity of persistent scheduling.

12. The device according to claim 10, wherein each persistent scheduling resource comprises one or a combination of:

a transmission direction, a periodicity, a resource position, an MCS, and an activation state.

* * * * *